United States Patent Office 3,396,083
Patented Aug. 6, 1968

3,396,083
PREFERENTIAL PRODUCTION OF CEPHALOSPORIN C, PENICILLIN N, OR CEPHALOSPORIN P
Donald Sidney Callow, Winterslow, Salisbury, England, assignor to National Research Development Corporation, London, England
Filed Apr. 7, 1965, Ser. No. 446,338
Claims priority, application Great Britain, Apr. 10, 1964, 14,896/64
4 Claims. (Cl. 195—36)

ABSTRACT OF THE DISCLOSURE

A process for the preferential production of any one of the antibiotics cephalosporin C, penicillin N and cephalosporin P produced by the *Emericellopsis-Cephalosporium* genera of fungi to a relatively greater extent than the other two wherein an *Emericellopsis-Cephalosporium* fungus is grown in a steady-state continuous-flow culture, and wherein cephalosporin C is preferentially produced by maintaining the pH of a culture medium in which nitrogen is the limiting nutrient between 7.25 and 7.8, penicillin N is preferentially produced by maintaining at a pH of at least 7.75 a culture medium in which carbon is the limiting nutrient or cephalosporin P is preferentially produced by maintaining the pH of a culture medium in which carbon or nitrogen is the limiting nutrient at between 5.0 and 5.75.

---

The present invention relates to fermentation processes for the production of antibiotics from the *Emericellopsis-Cephalosporium* genera of fungi.

The *Emericellopsis-Cephalosporium* genera of fungi produces a number of antibiotics chiefly those known as cephalosporin C, which is active against both gram positive and gram negative bacteria and is both acid stable and penicillinase resistant, cephalosporin N (or more correctly penicillin N), which is active against both gram positive and gram negative bacteria, and cephalosporin P, which is active only against gram positive bacteria.

These three antibiotics have been described in a paper by E. P. Abraham entitled "The Cephalosporins" published in Pharmacological Reviews, vol. 14 (1962), pp. 473–500.

These antibiotics are produced in different but often worthwhile concentrations by various strains and mutants of *Emericellopsis-Cephalosporium*. However, as the conditions in a batch culture vary continuously throughout the culture period it is very difficult in practice to determine and to provide the conditions most favorable to the production of a desired antibiotic or of the various antibiotics in a desired relative concentration.

It has now been discovered that when a *Emericellopsis-Cephalosporium* fungus is grown in a steady-state continuous culture, culture conditions can be selected which enable or encourage a desired one of the antibiotics to be produced by the fungus to a relatively greater extent than the other antibiotics. It has been found in particular that control of the pH of the culture medium together with proper selection of the limiting nutrient in the culture medium can provide conditions in which a desired one of the three major antibiotics, cephalosporin C and P and penicillin N, is produced predominantly or relatively more predominantly than the other two.

The Cephalosporium 8650 fungus (i.e. the Clevedon mutant 8650 of the Brotzu strain of Cephalosporium) and various mutants derived therefrom produce worthwhile amounts of cephalosporin C and also of penicillin N and cephalosporin P and it is a particular object of the present invention to provide a fermentation process which can provide a desired one of these antibiotics in a relatively greater concentration than can be achieved by a batch process.

In accordance with the invention therefore a *Emericellopsis-Cephalosporium* fungus and particularly a Cephalosporium 8650 fungus or mutant derived therefrom is grown in a steady-state continuous culture in which the pH value of the culture medium is so controlled and the limiting nutrient in the culture medium is so selected that a desired one of the three major antibiotics produced by the fungi is relatively more predominant in the product than the other two.

The particular conditions favoring the production of cephalosporin C at the expense of cephalosporin P and penicillin N are a controlled pH of between 7.25 and 7.8 for the culture medium with nitrogen as the limiting nutrient in the continuous culture medium. Cephalosporin P is favored by a low pH value between about 5.0 and 5.75 with carbon or nitrogen as the limiting nutrient, while penicillin N is favored by a high pH value of at least 7.75, preferably about 8, with no limitation of the supply of nitrogen nutrient.

In a steady-state continuous culture process, one of the nutrients essential for growth, e.g. carbon, nitrogen or phosphorus, becomes the limiting nutrient under the particular steady-state conditions, that is to say, it becomes the nutrient which actually limits the growth of the organism. A decrease in the concentration of the limiting nutrient causes a reduction in the dry weight of the mycelium while any increase (or decrease within limits) of the other nutrients does not affect the growth. The growth conditions of the *Emericellopsis-Cephalosporium* fungi is so characterized that their production of penicillin N is markedly reduced when nitrogen is the limiting nutrient.

The temperature at which the growth is carried out also has an effect upon the relative proportions of the antibiotics produced. The optimum temperature for the production of cephalosporin C is 27–29° C. while for penicillin N the optimum is within the range 27–36°.

The dilution rate of the continuous culture is also important and although the highest yield of mycelium is obtained with a dilution rate of about 1 to 2 volume changes per day the preferred dilution rate is about 0.5 to 1.0 volume changes per day as degeneration of the fungus is delayed longer within this range of dilution rates and the titre of the antibiotic produced is higher at a lower dilution rate.

By way of example only, the production of cephalosporin C and P and penicillin N by the Clevedon mutant 8650 of the Brotzu strain of Cephalosporium will now be described with reference to the accompanying drawings in which:

FIGURE 3 illustrates the relationship between yield constant and the pH of the culture medium; while

The fungus was grown in a single stage continuous culture apparatus with a working volume of 2 litres (comprising, as is customary, a medium reservoir, a growth vessel, a storage vessel and auxiliary control equipment). Aeration by an impeller was used to provide a supply of oxygen adequate for both growth and antibiotic production. A growth medium A with carbon as limiting nutrient was used based upon the batch culture medium of Demain, Newkirk and Hendlin, Journal of Bacteriology 1963, 85, 339, but with oleic acid, ε-amino-n-caproic acid, ε-N-acetyl-L-lysine and L-cysteine omitted.

The growth medium A and a corresponding growth medium B in which nitrogen is the limiting nutrient are as follows:

| Nutrient | Growth, Medium A (C limiting) g./l. | Growth, Medium B (N limiting) g./l. |
| --- | --- | --- |
| $Na_2SO_4$ anhyd | 0.76 | 7.5 |
| $CaCl_2.6H_2O$ | 0.114 | 0.114 |
| $(NH_4)_2SO_4$ | 7.5 | 1.25 |
| $KH_2PO_4$ | 7.8 | 7.8 |
| $K_2HPO_4$ | 10.5 | 10.5 |
| Glucose | 13.5 | 13.5 |
| Sucrose | 12.8 | 16.5 |
| DL-Methionine | 5.0 | 5.0 |
| Separate feed: | | |
| $MgSO_4.7H_2O$ | 0.36 | 0.36 |
| $ZnSO_4.7H_2O$ | 0.015 | 0.015 |
| $MnSO_4.4H_2O$ | 0.020 | 0.020 |
| $CuSO_4.5H_2O$ | 0.0035 | 0.0035 |
| $Fe(NH_4)_2(SO_4)_2.6H_2O$ | 0.079 | 0.079 |

In the growth medium A in which the 26.3 g./l. of carbohydrates was growth limiting the ammonium sulphate content can be reduced at least to 2.5 g./l. without any effect on the carbon-limiting nature of the growth medium. The ammonium sulphate content of growth medium B was reduced to 1.25 g./l. to achieve nitrogen-limiting growth conditions. The necessary metal salts were fed into the growth vessel separately from the main nutrient solution to avoid precipitation of metal phosphates in the medium reservoir of the continuous culture apparatus. E.D.T.A. cannot be used to prevent this precipitation because although it is not itself toxic to the fungus it so changed the balance of available metals that only poor growth was obtained.

Cephalosporin C was measured against a strain of *Alcaligenes feacalis* ATCC No. 8750 as described by Claridge and Johnson (2nd Interscience Conference on Antimicrobial Agents and Chemotherapy, Chicago, 1962). This organism is relatively insensitive to penicillin N but for testing fermentation broths with high penicillin N content it is advisable to treat first with penicillinase or dilute acid. Penicillin N was assayed with a strain of *Salmonello typhi* (Mrs S) the result being adjusted where necessary by substracting a correction factor if large amounts of cephalosporin C are present. For cephalosporin P, *staphylococcus aureus* NCTC 6571 strain was used with penicillinase incorporated into the assay medium. Recrystallised cephalosporin C was used as a standard for all assays.

Figure 1:
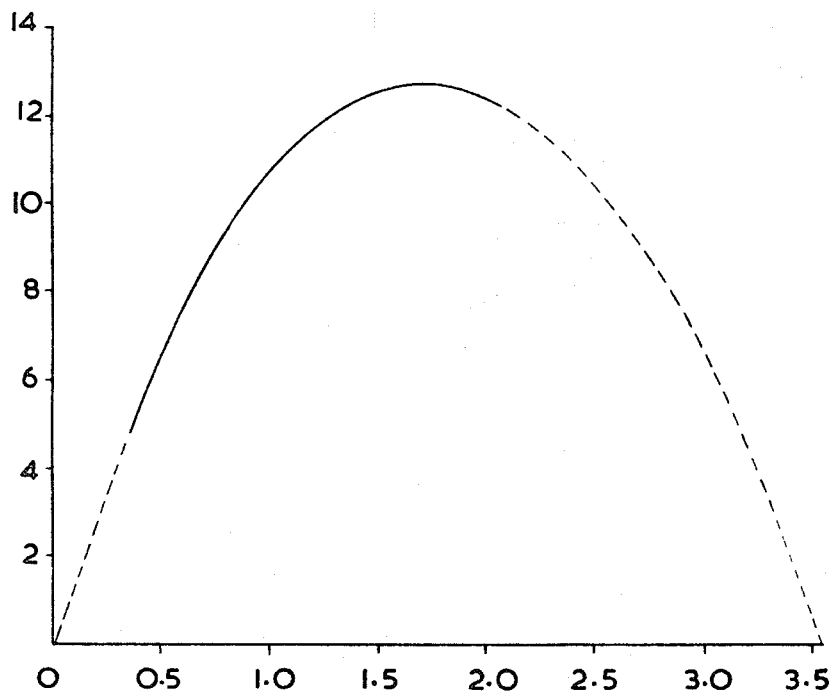
FIGURE 1 illustrates the relationship between the yield of mycelium and the dilution rate.

The pH of the culture medium was controlled at 6.5 and the temperature at 28° C. and when the dilution rate was varied the results shown in FIGURE 1 were obtained. As can be readily seen the optimum yield is obtained with a dilution rate of between about 1 and about 2 volume changes per day. The minimum doubling time was initially always between six and seven hours with an average of 6.6 hours. In a prolonged continuous culture, i.e., greater than about three to four weeks, with a dilution rate of 0.5 to 1.0 volume changes per day the minimum doubling time falls to about 4.5 hours accompanied by a loss of antibiotic producing power. For example, the titre of cephalosporin C remains substantially constant for three to four weeks but then falls and is zero at six to eight weeks and the titre of penicillin N generally starts to fall after six weeks and is generally zero after ten.

Figure 2:
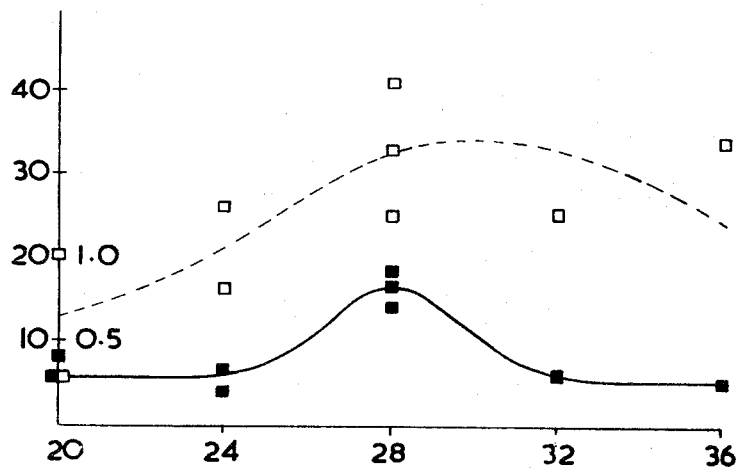
FIGURE 2 illustrates the relationship between the temperature of the culture medium and the yield of the antibiotics.

The pH of the culture medium was controlled at 6.5, the dilution rate at 0.7 volume changes per day and the temperature of the culture medium varied in 4 degree increments from 20 to 36° C. FIGURE 2, in which the solid squares show the titre of cephalosporin C and the hollow squares show the titre of penicillin N, shows that for cephalosporin C the optimum temperature is 27°–29° C. while for penicillin N there is much greater latitude the best yields being obtained within the range 27 to 36° C. with a serious fall off of titre only in the lower portion of the range tested. Cell morphology was affected by temperature, particularly at the lowest temperature tested where the mycelium consisted of small agglomerates of very short swollen hyphae.

The pH of the growth medium was varied over the range 5.8 to 8 with carbon as growth limiting nutrient and to a lesser extent with nitrogen limiting. For the nitrogen limited experiments the ammonium sulphate was reduced to ⅙ of the normal level, the sulphate concentration being kept constant by extra sodium sulphate. Extra sucrose was also added to increase the total sugar to 30 g./l. to ensure that an excess was always present.

Figure 3:
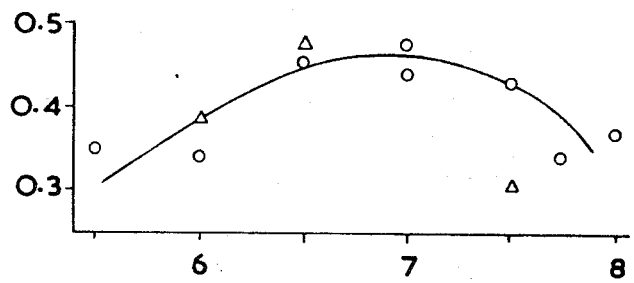

FIGURE 3, in which the triangles show values obtained with nitrogen limitation, shows that the yield constant Y, that is the amount of mycelium produced divided by the substrate used, is at a maximum between about 6.5 and 7.0.

Figure 4:
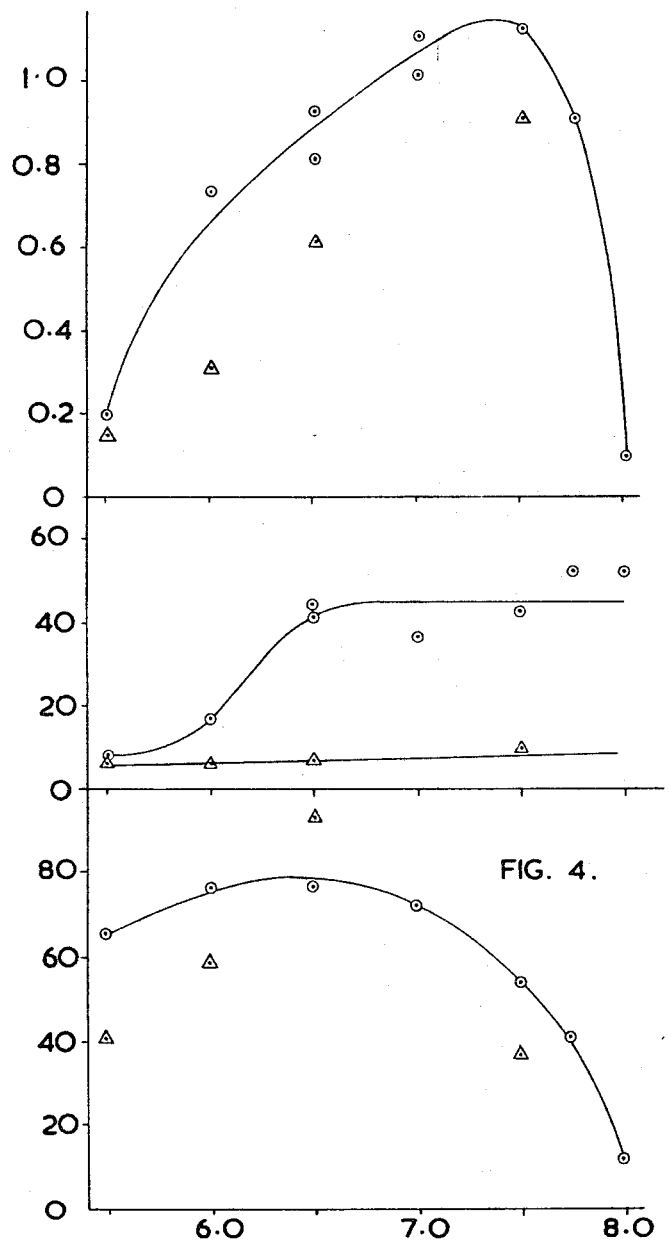
FIGURE 4 illustrates the relationship between the individual antibiotics and the pH of the culture medium, when carbon is the limiting nutrient in the continuous culture medium and also when nitrogen is used as the limiting nutrient.

FIGURE 4, in which the triangles show values obtained with nitrogen nutrient limitation, shows the effect of varying the pH of the growth medium upon the titre of the individual antibiotics produced. The optimum for cephalosporin C lies within the range from about pH 7.0 to 7.5, for cephalosporin P it is within the range from about pH 6.0 to 7.0 and for penicillin N from about pH 6.5 up to at least 8.0. The most marked effect when nitrogen is the limiting nutrient is shown by penicillin N which is suppressed to a low level although cephalosporin C and P are both somewhat reduced. Accordingly cephalosporin C predominates in a continuous culture having a precisely controlled pH of 7.5 to 7.8 with nitrogen as the limiting nutrient, while at a low pH, about 5.5, cephalosporin P predominates, and at a high pH, about 8.0, and excess nitrogen penicillin N predominates.

U.K. patent specification No. 894,899 describes 2-stage fermentation processes in which the conditions are arranged to favor growth in the first stage and elaboration of the product in the second stage. In carrying out the production of cephalosporin C in accordance with the present invention in two stages it is convenient for the limiting nutrient in the first stage to be nitrogen because then excess carbon nutrient is carried over into the second stage where it maintains the cells viable during elaboration of the antibiotics.

By way of example, single-stage continuous processes for the production of cephalosporin C, cephalosporin P and penicillin N will now be described.

Each process was carried out in a culture vessel having a 2-litre working capacity of the type described in a paper by R. Elsworth, L. R. P. Meakin, S. J. Pirt and G. H. Capel entitled "A Two-litre Scale Continuous Culture Vessel for Micro-organisms" published in the Journal of Applied Bacteriology, vol. 19, No. 2, December 1956, p. 264. Each process was initiated by filling the culture vessel with two litres of growth medium and innoculating with a prepared culture of Cephalosporium 8650.

During the continuous culture processes in which growth medium was steadily fed into the culture vessel and culture medium flowed out at an equivalent rate, steady state conditions were maintained by automatic pH control apparatus as described in a paper by D. S. Callow and S. J. Pirt entitled "Automatic Control of pH value in Cultures of Micro-organisms" published in the Journal of General Microbiology, vol. 14(1956) at p. 661. The culture media were aerated by the vortex system with a six-bladed vaned disc turbine rotating at 800 r.p.m. giving sulphite oxidation values of about 70 mmoles of oxygen/ litre/hour. The metal salts of the growth medium were fed into the culture vessel from a separate storage vessel from that containing the main nutrient solution as previously described.

Example 1

After innoculation of the medium in the 2-litre culture vessel, the nutrient medium B as previously defined herein, having nitrogen as the limiting nutrient (1.25 g./l. of ammonium sulphate), was fed continuously to the culture vessel at a rate of about 60 ml./hour so that the dilution rate was 0.7 volume changes per day. The pH of the culture medium was maintained at 7.5 and the temperature at 28° C. throughout the continuous culture process.

Cephalosporin C was obtained in a concentration of 0.9 units/ml. in the outflowing culture fluid (about 60 ml./hour) for periods up to three weeks. The culture fluid can be filtered to remove the mycelium and cephalosporin C (with if desired any penicillin N produced) may be extracted from the resulting clarified fluid by means of an appropriate ion-exchange technique (re. the paper entitled "The Cephalosporins" by E. P. Abraham published in the Pharmacological Reviews vol. 14 (1962), pp. 473–500; at p. 479).

Example 2

After inoculation of the medium in the 2-litre culture vessel, the nutrient medium A as previously defined herein, having carbon as the limiting nutrient, was fed continuously to the culture vessel at a rate of about 60 ml./hour so that the dilution rate was 0.7 volume changes per day. The pH value of the culture medium was maintained at 8.0 and the temperature at 28° C. throughout the process.

Penicillin N was obtained in a concentration of about 50 units/ml. in the outflowing culture fluid (about 60 ml./hour) for periods of six weeks or more. The culture fluid can be filtered to remove the mycelium and penicillin N may be extracted from the resulting clarified fluid by absorption on and elution from activated charcoal followed by chromatographic methods as described in the afore-mentioned paper by E. P. Abraham on p. 479.

Example 3

A continuous culture process was carried out in the 2-litre culture vessel by continuously feeding the nutrient medium A as previously defined, having carbon as the limiting nutrient, at a rate of about 60 ml./hour so the dilution rate in the vessel was about 0.7 volume changes per day. The pH value of the culture medium was maintained at 5.5 and the temperature at 28° C. throughout the process.

Cephalosporin P was obtained in a concentration of about 65 units /ml. in the outflowing culture fluid (about 60 ml./hour) for periods up to four weeks. The culture fluid can be filtered to remove the mycelium and cephalosporin P may be extracted with butyl acetate at pH 6.5, and purified by counter-current distribution in hexane, di-isopropyl ether, acetone and phosphate buffer at pH 6.0 as described in the above-mentioned paper by E. P. Abraham at p. 475.

We claim:

1. A process for the preferential production of cephalosporin C, penicillin N and cephalosporin P which comprises growing *Emericellopsis-Cephalosporium* fungus in a steady-state continuous-flow culture and wherein cephalosporin C is preferentially produced, maintaining the pH of a culture medium in which nitrogen is the limiting nutrient between 7.25 and 7.8, wherein penicillin N is preferentially produced, maintaining at a pH of at least 7.75 a culture medium in which carbon is the limiting nutrient or wherein cephalosporin P is preferentialy produced, maintaining the pH of a culture medium in which carbon or nitrogen is the limiting nutrient at between 5.0 and 5.75.

2. A process according to claim 1 in which the fungus cultured is of Cephalosporium 8650.

3. A process according to claim 1 wherein the dilution rate of the continuous culture is maintained between about 0.5 and 1.0 volume changes per day.

4. A process according to claim 1 wherein the temperature of the culture medium is maintained at about 28° C.

References Cited

UNITED STATES PATENTS

| | | | |
|---|---|---|---|
| 2,822,319 | 8/1954 | Monod | 195—115 |
| 2,883,328 | 4/1959 | Florey et al. | 195—81 |
| 3,139,388 | 6/1964 | Platt et al. | 195—36 |

A. LOUIS MONACELL, *Primary Examiner.*

N. ROSKIN, *Assistant Examiner.*